US006890070B2

(12) United States Patent
Ohya et al.

(10) Patent No.: US 6,890,070 B2
(45) Date of Patent: May 10, 2005

(54) INK-JET IMAGE FORMING METHOD AND INK-JET IMAGE

(75) Inventors: Hidenobu Ohya, Tokyo (JP); Shuji Kida, Tokyo (JP); Shinichi Suzuki, Tokyo (JP); Makoto Kaga, Tokyo (JP); Teruyuki Fukuda, Tokyo (JP)

(73) Assignee: Konica Corporation, Tokyo (JP)

( * ) Notice: Subject to any disclaimer, the term of this patent is extended or adjusted under 35 U.S.C. 154(b) by 166 days.

(21) Appl. No.: 10/186,353

(22) Filed: Jun. 28, 2002

(65) Prior Publication Data

US 2003/0160850 A1 Aug. 28, 2003

(30) Foreign Application Priority Data

Jul. 4, 2001 (JP) ....................................... 2001-203314

(51) Int. Cl.[7] ............................. B41J 2/01; C09D 11/00

(52) U.S. Cl. ....................... 347/101; 347/102; 347/105; 428/195; 106/31.6

(58) Field of Search ................................ 347/101, 102, 347/105; 428/195; 106/31.6

(56) References Cited

U.S. PATENT DOCUMENTS

| | | | | | |
|---|---|---|---|---|---|
| 4,853,274 | A | * | 8/1989 | Makishima et al. | 428/143 |
| 5,053,382 | A | * | 10/1991 | Akada et al. | 503/227 |
| 5,326,596 | A | * | 7/1994 | Kasari et al. | 204/488 |
| 5,468,527 | A | * | 11/1995 | Peiffer et al. | 428/35.7 |
| 5,861,896 | A | * | 1/1999 | Barton et al. | 347/15 |
| 5,942,329 | A | * | 8/1999 | Nakayama et al. | 428/423.1 |
| 6,299,675 | B1 | * | 10/2001 | Ono et al. | 106/31.27 |
| 6,332,679 | B1 | * | 12/2001 | Higuma et al. | 347/102 |
| 6,336,720 | B1 | * | 1/2002 | Suzuki et al. | 347/88 |
| 6,357,871 | B1 | * | 3/2002 | Ashida et al. | 347/106 |
| 6,419,355 | B1 | * | 7/2002 | Bermel et al. | 347/105 |
| 6,459,501 | B1 | * | 10/2002 | Holmes | 358/1.9 |
| 6,471,757 | B1 | * | 10/2002 | Koitabashi et al. | 106/31.28 |
| 6,613,418 | B2 | * | 9/2003 | Tachikawa et al. | 428/323 |
| 2001/0030677 | A1 | * | 10/2001 | Inamoto | 347/101 |
| 2001/0035929 | A1 | * | 11/2001 | Nakamura et al. | 349/137 |
| 2002/0071018 | A1 | * | 6/2002 | Tachikawa et al. | 347/106 |
| 2002/0112644 | A1 | * | 8/2002 | Nakamura et al. | 106/401 |

FOREIGN PATENT DOCUMENTS

| | | | | |
|---|---|---|---|---|
| EP | 1 044 823 A2 | | 10/2000 | |
| JP | 2000218924 | | 8/2000 | |
| JP | 2000296667 | | 10/2000 | |
| JP | 2001096909 | | 4/2001 | |
| JP | 2003191460 A | * | 7/2003 | B41J/2/01 |

* cited by examiner

*Primary Examiner*—Stephen D. Meier
*Assistant Examiner*—Leonard Liang
(74) *Attorney, Agent, or Firm*—Squire, Sanders & Dempsey LLP

(57) ABSTRACT

An ink-jet recording method comprising the steps of: forming a pigment image on a recording medium by jetting pigment ink; and adjustment thew C value of the pigment image to 60 or more.

23 Claims, 2 Drawing Sheets

INK-JET IMAGE FORMING METHOD AND INK-JET IMAGE

FIELD OF THE INVENTION

The present invention relates to a new ink-jet image forming method and an ink-jet image prepared by the method.

BACKGROUND OF THE INVENTION

In recent years, advances in ink-jet technology have been remarkable and together with improvements in printer technology, ink technology and exclusive recording media technology, made ink-jet images to be called as photographic images. As image quality improves, storage stability of ink-jet images has come to be compared with that of conventional silver salt photography, and, with respect to many dye inks, deterioration accompanied by migration of colorants such as poor water resistance and anti-bleeding property of ink-jet images, or accompanied by a chemical reaction characteristic to colorants such as poor light fastness and anti-oxidizing gas resistance, has been pointed out.

On the other hand, in order to improve storage stability of dye ink images, utilization of a pigment ink has been often proposed. However, it is not preferable that glossy appearance similar to that of silver salt photography may not be obtained and metallic gloss called bronzing may be observed in case of pigment inks. Further, only utilizing pigment inks can not achieve sufficient storage stability of images and in particular weakness of water fastness is remarkable.

In JP-A 2000-158803 (the term, JP-A refers to an unexamined and published Japanese Patent Application), a method to improve water resistance, light fastness and gloss has been proposed by recording with a pigment ink onto a recording medium having a layer comprised of thermoplastic organic fine particles and being followed by heat fixing. However, the gloss level was not sufficient and still inferior to that of silver salt photography, and water resistance was also insufficient. In addition, appearance of bronzing was observed which was not preferable, and it was not satisfactory in respect to oxidizing gas resistance. Consequently, urgent improvement has been demanded.

SUMMARY OF THE INVENTION

The invention has been performed in view of the aforementioned subject and the first object is to provide an ink-jet image forming method and an ink-jet image, which are provided with gloss equal to that of silver salt photography. The second object of the invention is to provide an ink-jet image forming method and an ink-jet image, which are free of bronzing. The third object of the invention is to provide an ink-jet image forming method and an ink-jet image which are provided with enhanced water resistance. The fourth object of the invention is to provide an ink-jet image forming method and an ink-jet image, which are provided with enhanced oxidizing gas resistance. The fifth object of the invention is to provide an ink-jet image forming method, which is capable of matching to commercial application such as print output service or fast and continuous output.

The aforementioned objects have been achieved by the following constitutions.

Item.1

An ink-jet image forming method comprising the steps of:

forming a pigment image on a recording medium by jetting a pigment ink; and adjusting the C value of the pigment image to 60 or more.

Item.2

The ink-jet image forming method of Item.1, wherein the adjusting step comprises fixing the pigment image formed on the recording medium by heating.

Item.3

The ink-jet image forming method of Item.1, wherein the adjusting step comprises applying pressure onto the pigment image formed on the recording medium.

Item.4

The ink-jet image forming method of Item.2, wherein the adjusting step further comprises applying pressure onto the pigment image formed on the recording medium.

Item.5

The ink-jet image forming method of Item.1, wherein the recording medium comprises an outermost layer comprising a thermoplastic resin.

Item.6

The ink-jet image forming method of Item.5, wherein the adjusting step comprises fixing the pigment image formed on the recording medium by heating.

Item.7

The ink-jet image forming method of Item.6, wherein the adjusting step further comprises applying pressure onto the pigment image formed on the ink-jet recording medium.

Item.8

The ink-jet image forming method of Item.5, wherein the recording medium further comprises inorganic pigments.

Item.9

The ink-jet image forming method of Item.5, wherein the recording medium comprises a support, and at least an ink-absorbing layer between the support and the outermost layer.

Item.10

The ink-jet image forming method of Item.9, wherein the outermost layer further comprises inorganic pigments.

Item.11

The ink-jet image forming method of Item.10, wherein the adjusting step comprises fixing the pigment image formed on the recording medium by heat.

Item.12

The ink-jet image forming method of Item.11, wherein the adjusting step further comprises applying pressure onto the pigment image formed on the recording medium.

Item.13

The ink-jet image forming method of Item.1, wherein the pigment ink comprises pigments having an average diameter of 30 nm to 200 nm.

Item.14

The ink-jet image forming method of Item.1, wherein the jetting step comprises jetting at least a pair of pigment inks having the same color and different concentrations of pigment.

Item.15

The ink-jet image forming method of Item.1, wherein the recording medium has at least a porous layer.

Item.16

The ink-jet image forming method of Item.1, wherein the pigment ink comprises an acetylene series surfactant.

Item.17

The ink-jet image forming method of Item.1, wherein the method comprises a step of adjusting the 60-degree specular glossiness of the pigment image to 70% or more.

Item.18

The ink-jet image forming method of Item.1, wherein the method comprises a step of adjusting the average centerline roughness of the pigment image to 0.5 $\mu$m or less.

Item.19

An ink-jet image formed by jetting a pigment ink onto an recording medium having a C value of not less than 60.

Item.20

The ink-jet image of Item.19, wherein the ink-jet image has an average centerline roughness of not more than 0.5 μm.

Item.21

The ink-jet image of Item.19, wherein the recording medium comprises at least a porous layer.

Item.22

The ink-jet image of Item.19, wherein the ink-jet image has a 60-degree specular glossiness of not less than 70%.

Item.23

The ink-jet image of Item.19, wherein the pigment ink has an average diameter of 30 nm to 200 nm.

DETAILED DESCRIPTION OF THE INVENTION

Figure 1:
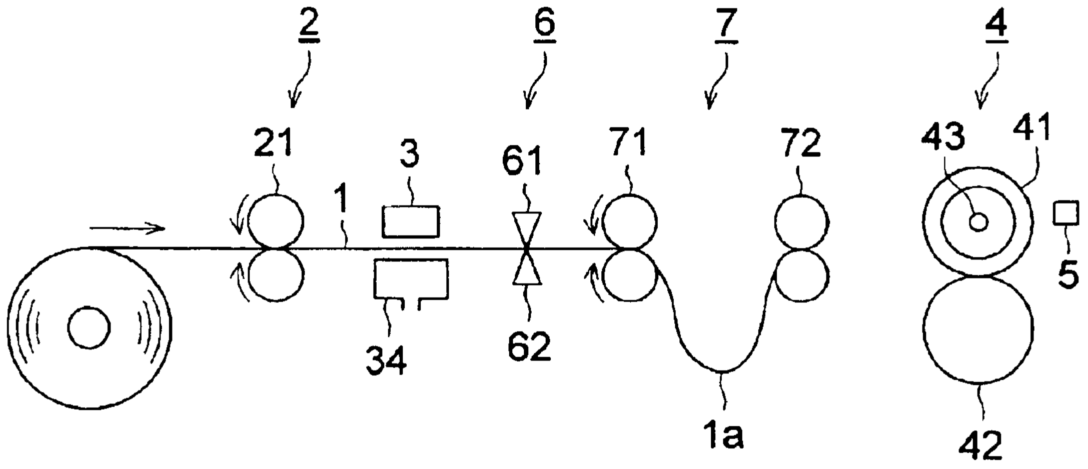
FIG. 1 is a brief structural drawing showing an example of an ink-jet recording apparatus utilized in the invention.
Figure 2:
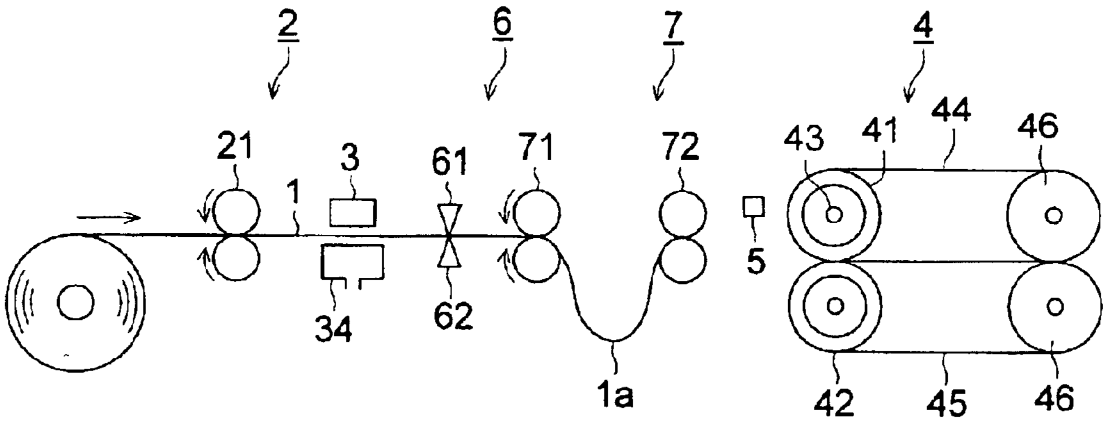
FIG. 2 is a brief structural drawing showing another example of an ink-jet recording apparatus utilized in the invention.

The present invention will be detailed below.

The invention is characterized by that a C value (image definition) of an ink-jet pigment image is adjusted at not less than 60.

The C value in the invention is a value measured by a reflection method using a 2 mm optical wedge among image definitions as defined in JIS K7105, except that the angle of the light beam applied to the test piece is adjusted to 60° instead of the usual angle of 45°.

Hereinafter, the measuring method of the C value will be detailed.

The distinctness of image shall be calculated from the results obtained by measuring the light reflected by the test piece through a moving optical comb by using a measuring apparatus for distinctness of image. The distinctness of image is referred to as the C value. In the invention as the measuring apparatus, IMAGE CLARITY METER (ICM-IDP) manufactured by Suga Test Instruments Co. is used.

Measuring Method

The measurement is carried out as follows:

(1) With the specimen base of the apparatus in the condition with a black glass standard surface attached, the optical comb is moved and the wave form of the received light is recorded. In this case, make adjustment so that the recorded wave height for the dark part of the optical comb become zero.

(2) After attaching the test piece to the specimen base, move the optical comb to make adjustment so that the maximum recorded wave form comes to a suitable position on the recording paper sheet in order to facilitate the measurement.

(3) Perform measurement by moving the optical comb within the range of a prescribed width and reading the maximum wave height (M) and minimum wave height (m) on the recording paper sheet.

Method of Calculation

The distinctness of image (C value) is calculated from the following formula:

$$C=(M-m)/(M+m)\times 100$$

Wherein C is distinctness of image (%); M is maximum wave height; and m is minimum wave height.

Various ink-jet pigment images with different C values were studied and it has been found that glossy appearance can be obtained with increase of a C value to achieve images nearly equal to those of silver salt photography. Further, it has been surprisingly proved that bronzing phenomenon characteristic to ink-jet pigment images is depressed with the increase of a C value. Further, it has been found that image storage stability such as water resistance and oxidizing gas resistance is also improved with the increase of a C value.

Images having a C value of not less than 60 can achieve the effect as the objects of the invention, however, it is preferably from 70 to 90, and more preferably from 75 to 90.

A method to make a C value defined in the invention not less than 60 is not specifically limited and it can be achieved by suitably selecting or combining methods in which after printing an ink pigment onto a recording medium images are subjected to heat or pressure, or to both heat and pressure; solvents and plasticizers are added to images followed by heating; or thermoplastic resin components are supplied to images followed by heating; or by performing plural times of these processes.

In the invention, a mean centerline roughness, Ra, of an ink-jet pigment image is adjusted to preferably not more than 0.5 μm, and more preferably from 0.01 to 0.5 μm.

A mean centerline roughness, Ra, referred in the invention is defined by JIS-B-0601 of JIS surface roughness. That is to say, a mean center line roughness (Ra) refers to the value determined by the following equation and expressed in micrometer (μm) when a portion of measured length L along the direction of a center line (in the invention, preferably 2.5 mm) is extracted from a roughness curve, and the center line of the extracted portion is expressed as X axis, the vertical magnification direction as Y axis and the roughness curve as Y=f (X).

Equation 1

$$Ra = \frac{1}{L}\int_{O}^{L} |f(X)|\,dx \qquad \text{Equation 1}$$

As a measurement of a center line roughness (Ra), samples are conditioned under an environment of 25° C. and 65% RH for 24 hours while not being overlapped each other, and measurement is performed under the same condition to determine the roughness. Herein, a condition of not being overlapped each other can be achieved, for example, by anyone of the following: a method in which samples are wound up making the both edges of the support material thick, a method in which samples are stacked sandwiching a piece of paper between the support materials, or a method in which samples are fixed at four corners by a frame made of such as cardboard. The measuring equipment includes, for example, RSTPLUS non-contact measurement system for three-dimensional micro surface forms, produced by WYKO Co.

The effect as the objects of the invention can be exhibited more effectively when a C value is not less than 60 and a Ra is not more than 0.5 μm. More preferable is the case with a C value of from 60 to 90 and a Ra of from 0.01 to 0.2 μm.

Further, in the invention it is preferred that an ink-jet image is adjusted to have a C value of not less than 60 and a 60-degree specular glossiness of not less than 70%, or to have a C value of not less than 60, a Ra of not more than 0.5 μm and a 60-degree specular glossiness of not less than 70%. In this case, the effect of the invention is effectively exhibited. In the invention a 60-degree specular glossiness of the ink-jet image is measured in accordance with JIS-Z8741. As the measuring apparatus, GLOSS METER (VGS-1001DP) produced by Nippon Denshoku Industries Co., Ltd. is used.

The most preferable is to adjust a C value to from 70 to 90, a Ra to from 0.01 to 0.2 μm and a 60-degree specular glossiness to not less than 100%, and the effect of the invention is most effectively exhibited by these conditions.

Next, a recording medium utilized in the invention will be explained.

A recording medium is not limited provided that it can receive a pigment ink and allow image formation, however, a support material having an ink absorbing layer thereon is preferred in respect to strength.

As a support materials, ones conventionally used for ink-jet recording media, for example, paper substrates such as plain paper, art paper, coated paper and cast-coated paper, plastic substrates, paper substrates whose both surface are laminated with polyolefin; and hybrid substrates in which these substrates are laminated with each other can be utilized.

It is preferable to provide corona discharge treatment or under coat treatment on a support material with the intention of such as enhancing adhesion strength between the support and an ink absorbing layer. Further, a recording paper of the invention is not necessarily colorless and may be colored one. It is especially preferred to use a paper support being laminated with polyethylene on the both sides of the raw paper so that recorded images are similar to photographic ones and images at low cost and with high quality can be obtained.

Such a paper support laminated with polyethylene will be explained below. A raw paper utilized for the paper support is made into paper using wood pulp as a starting material being added, if necessary, with synthetic pulp such as polypropylene or synthetic fiber such as nylon and polyester in addition to wood pulp. As wood pulp, for example, any of LBKP, LBSP, NBKP, NBSP, LDP, NDP, LUKP and NUKP can be utilized, however, it is preferred to utilize more amount of LBKP, NBSP, LBSP, NDP and LDP which contain more short fiber component. However, a ratio of LBSP or LDP is preferably not less than 10 weight % and not more than 70 weight %.

As the aforementioned pulp, preferably utilized chemical pulp (such as sulfate salt pulp and sulfite salt pulp) containing few impurities, and pulp of which whiteness has been improved by bleach treatment is also useful.

In a raw paper, can be added suitably, for example, a sizing agent such as a higher fatty acid and an alkylketene dimer, a white pigment such as calcium carbonate, talc and titanium oxide; a paper strength enhancing agent such as starch, polyacrylamide and polyvinyl alcohol; an optical brightening agent; a moisture keeping agent such as polyethylene glycol series; a dispersing agent; and a softening agent such as quaternary ammonium.

Freeness of pulp utilized-for paper making is preferably from 200 to 500 ml based on CSF definition, and the fiber length after being freed preferably have from 30 to 70% of a sum of the residual weight % at 24 mesh and that at 42 mesh, based on the definition by JIS-P-8207. Herein, the residual weight % at 4 mesh is preferably not more than 20 weight %.

A basis weight of a raw paper is preferably from 30 to 250 g, and specifically preferably from 50 to 200 g. Thickness of a raw paper is preferably from 40 to 250 μm.

A raw paper may be provided with high smoothness by calendar treatment during or after paper making. Density of a raw paper is generally from 0.7 to 1.2 g/$cm^3$ (JIS-P-8118). Further, paper rigidity is preferably from 20 to 200 g under the conditions described in JIS-P-8143.

A surface sizing agent may be coated on the surface of a raw paper and as surface sizing agents can be utilized ones which can be added in a raw paper described above such as higher fatty acid and alkylketene dimer.

The pH of a raw paper is preferably from 5 to 9, based on the measurement according to a hot water extraction method defined by JIS-P-8113.

Polyethylene which covers the front and back surfaces of a raw paper is mainly low density polyethylene (LDPE) and/or high density polyethylene (HDPE), however, other LLDPE or polypropylene can be also partly used.

In particular, a polyethylene layer on the ink absorbing layer side is preferably comprised of polyethylene being added with rutile or anatase type titanium oxide and improved in opacity and whiteness, which is commonly utilized in photographic paper. The content of titanium oxide is generally from 3 to 20 weight %, and preferably from 4 to 13 weight % based on polyethylene.

In the invention, polyethylene laminated paper can be used as glossy paper, or as one provided with a mat surface or a silky surface commonly prepared as a photographic paper which is formed by so-called embossing treatment at the coating process of polyethylene by melt extrusion onto the surface of a raw paper.

The using amount of polyethylene on the front and back surfaces of a raw paper is selected so as to optimize curl under high and low humidity after providing a porous layer or a backing layer, however, is generally in a range from 20 to 40 μm as a polyethylene layer on the porous layer side and from 10 to 30 μm on the backing layer side.

Further, the aforementioned polyethylene laminated paper support is preferably provided with the following characteristics.

1. Tensile strength: preferably from 2 to 30 kg in a longitudinal direction and from 1 to 20 kg in a horizontal direction based on the definition of JIS-P-8113
2. Tear strength: preferably from 10 to 200 g in a longitudinal direction and from 20 to 200 g in a horizontal direction based on the definition of JIS-P-8116
3. Modules of compressive elasticity ≧98.1 Mpa
4. Surface Beck smoothness: preferably not less than 20 sec. as a glossy surface under the condition defined by JIS-P-8119, however, it may be not more than this as a so-called embossed product
5. Surface roughness: preferably not more than 10 μm per a standard length of 2.5 mm based on surface mean roughness defined in JIS-B-0601
6. Opacity: preferably not less than 80%, and specifically preferable 85 to 98%, when measured by a method defined in JIS-P-8138
7. Whiteness: preferably L*=80 to 95, a*=−3 to +5 and b*=−6 to +2, based on L*, a* and b* defined in JIS-Z-8729
8. Surface gloss: preferably 10 to 95% based on 60-degree mirror surface gloss defined in JIS-Z-8741
9. Clark rigidity: support material having Clark rigidity, in a transportation direction of a recording paper, of from 50 to 300 $cm^2$/100 is preferable
10. Moisture content of center stock: generally from 2 to 100 weight %, and preferably from 2 to 6 weight %, based on a center stock As an ink-absorbing layer of a recording medium, there are a swelling type and a porous type, being roughly grouped.

As a swelling type, can be utilized one wherein a hydrophilic binder such as gelatin, polyvinyl alcohol, polyvinyl pyrrolidone and polyethylene oxide, alone or in combinations thereof, is coated to prepare an ink-absorbing layer.

A porous type is one wherein fine particles and hydrophilic binders are mixed and coated, and specifically preferably has gloss. Fine particles are preferably alumina or silica, and specifically preferable is one utilizing silica having a particle diameter of not more than 0.1 $\mu$m. A hydrophilic binder is preferably, for example, gelatin, polyvinyl alcohol, polyvinyl pyrrolidone and polyethylene oxide, alone or in combinations thereof.

To provide adaptability to a continuous or high speed printing, it is preferred that the ink absorbing speed is fast, and in this respect a porous type can be specifically preferably utilized.

A porous type ink absorbing layer will be further detailed below.

A porous layer is formed mainly by mild coagulation of a hydrophilic binder and inorganic fine particles. Heretofore, various methods to form pores in a film are known, and, for example, such as a method in which pores are formed by coating a homogeneous coating solution containing two or more kinds of polymers on a support material and causing phase separation of these polymers each other during drying process; a method in which pores are formed by coating a homogeneous coating solution containing solid fine particles and a hydrophilic or hydrophobic binder on a support material and dissolving solid fine particles by immersion of the recording paper into water or suitable organic solvents after drying; a method in which pores are formed in a film by coating a coating solution containing chemical compounds which exhibit foaming during film formation followed by causing the chemical compounds to foam during drying process; a method in which pores are formed in porous solid fine particles or between fine particles in a film by coating a coating solution containing porous solid fine particles and a hydrophilic binder on a support material; and a method in which pores are formed between solid fine particles by coating a coating solution containing solid fine particles and/or fine oil particles having approximately an equivalent volume based on a hydrophilic binder, and a hydrophilic binder on a support material, are known. In the invention, it is specifically preferred to form pores by including various inorganic fine particles having a mean diameter of not more than 100 nm in a porous layer.

Inorganic fine particles utilized in the above purpose include, for example, white inorganic pigments such as precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatom earth, calcium silicate, magnesium silicate, synthetic amorphous silica, colloidal silica, alumina, colloidal alumina, pseudoboehmite, aluminum hydroxide, lithopone, zeolite and magnesium hydroxide.

An average particle diameter of inorganic fine particles is determined, by observing particles themselves appearing at the cross-section or the surface of a porous layer, as a simple average value (an average based on a particle number) of measured particle diameters for arbitrarily selected 1000 particles. Herein, a particle diameter of individual particles is presented by a diameter of the supposed circle with an equivalent projected area.

As solid fine particles, are preferably used solid fine particles selected from silica, alumina or alumina hydrate, and more preferable is silica.

As silica, preferably utilized is silica synthesized by means of a conventional wet process, colloidal silica, or silica synthesized by means of gas phase reaction, and in the invention, specifically-preferably utilized is colloidal silica or silica synthesized by means of gas phase reaction. Among them preferable is fine particle silica synthesized by means of gas phase reaction since it achieves high porosity as well as being hard to form coarse coagulate materials when added to a cationic polymer, which is used for the purpose of fixing dyes. Further, alumina or alumina hydrate may be either crystal or amorphous, and can be used in any form such as an irregular particle, a cubic particle and a needle-like particle.

Fine particles are preferably in a dispersed state of primary particles as a dispersion solution of fine particles before being mixed with a cationic polymer.

Inorganic fine particles preferably have a particle diameter of not more than 100 nm. For example, in case of fine particle silica by gas phase reaction described above, a average particle diameter of primary particles of inorganic fine particles in a dispersion state of primary particles (a particle diameter in a dispersed solution before coating) is preferably not more than 100 nm, more preferably from 4 to 50 nm, and most preferably from 4 to 20 nm.

As silica synthesized by means of gas phase reaction and having from 4 to 20 nm of a average particle diameter of a primary particle, which is most preferably used, for example, Aerosil manufactured by Nippon Aerosil Corp., is available on the market. This fine particle silica synthesized by gas phase reaction can be relatively easily dispersed in water into primary particles by suction dispersion with such as "Jet Stream Inductor Mixer", produced by Mitamura Riken Industrial Co., Ltd.

Hydrophilic binders include, for example, such as polyvinyl alcohol, gelatin, polyethylene oxide, polyvinyl pyrrolidone, polyacrylic acid, polyacrylamide, polyurethane, dextran, dextrin, carrageenan (such as $\kappa$, $\iota$ and $\lambda$), agar, pullulan, water-soluble polyvinyl butyral, hydroxyethyl cellulose and carboxymethyl cellulose. These water-soluble resins may be used in combinations of two or more kinds.

A water-soluble resin preferably used in the invention is polyvinyl alcohol. Polyvinyl alcohol preferably used in the invention includes, in addition to general polyvinyl alcohol obtained by hydrolysis of polyvinyl acetate, modified polyvinyl alcohol such as polyvinyl alcohol with cation modified end and anion modified polyvinyl alcohol provided with an anionic group.

Polyvinyl alcohol obtained by hydrolysis of vinyl acetate used in the invention preferably have a mean polymerization degree of not less than 1,000, specifically preferably have a mean polymerization degree of from 1,500 to 5,000. A Saponification degree is preferably from 70 to 100%, and specifically preferably 80 to 99.5%.

Cation modified polyvinyl alcohol includes, for example, polyvinyl alcohol having a primary to tertiary amino group or a quaternary ammonium group in a main or branched chain of the polyvinyl alcohol, which is described in JP-A 61-10483 and can be prepared by saponification of a copolymer of an ethylenically unsaturated monomer and vinyl acetate.

An ethylenically unsaturated monomer having a cationic group includes, for example, trimethyl-(2-acrylamide-2,2-dimethylethyl)ammonium chloride, trimethyl-(3-acrylamide-3,3-dimethylpropyl)ammonium chloride, N-vinylimidazol, N-vinyl-2-methylimidazol, N-(3-dimethylaminopropyl)methacrylamide, hydroxyethyl trimethylammonium chloride, trimethyl-(2-methacrylamidepropyl)ammonium chloride and N-(1,1-dimethyl-3-dimethylaminopropyl)acrylamide.

The ratio of a monomer containing a cation modified group is from 0.1 to 10 molt, and preferably from 0.2 to 5 molt, based on vinyl acetate.

Anion modified polyvinyl alcohol includes, for example, polyvinyl alcohol having an anionic group such as described in JP-A 1-206088, copolymer of vinyl alcohol and a vinyl compound including a water-soluble group such as described in JP-A 61-237681 and 63-307979 and modified polyvinyl alcohol having a water-soluble group such as described in JP-A 7-285265.

Further, nonion modified polyvinyl alcohol includes, for example, polyvinyl alcohol derivatives in which a polyalkylene oxide group is added to a part of polyvinyl alcohol such as described in JP-A 7-9758 and a block copolymer of vinyl compound having a hydrophobic group and vinyl alcohol such as described in JP-A 8-25795.

Polyvinyl alcohol can be used in combination of two or more kinds which have different polymerization degrees or kinds of modification.

The addition amount of inorganic fine particles used in a colorant receiving layer depends on a required ink absorption capacity, a porosity of a porous layer, a kind of fine particles and a kind of water-soluble resins, however, is generally from 5 to 30 g, and preferably from 10 to 25 g, based on 1 $m^2$ of a recording paper.

Further, the ratio of inorganic fine particles to a water-soluble resin used in a colorant receiving layer is generally from 2/1 to 20/1, and specifically preferably from 3/1 to 10/1.

The colorant receiving layer may contain a cationic water-soluble resin having a quaternary ammonium salt group in the molecule, and it is utilized generally in a range of from 0.1 to 10 g, and preferably in a range from 0.2 to 5 based on 1 $m^2$ of recording paper.

In a porous layer, a total volume of pore (a pore volume) is preferably not less than 20 ml per 1 $m^2$ of a recording paper. When it is less than 20 ml/$m^2$, although ink absorption being good in case of small amount of ink, ink is not absorbed completely and this causes problems, such as deterioration of image quality and delay of drying, in case of increased amount of ink.

In the porous layer having ink holding ability, the pore volume divided by the solid volume is called porosity. In the invention, a porosity of not less than 50% is preferred because pore can be formed efficiently without unnecessarily increasing the layer thickness.

Other types of porous layer, other than forming an ink solvent absorbing layer by use of inorganic fine particles, may be formed by utilizing a coating solution in which a polyurethane resin emulsion and a water-soluble epoxy compound and/or acetoacetylated polyvinyl alcohol are used in combination, further being added with an epichlorohydrin polyamide resin. In this case, a polyurethane resin emulsion is preferably one having a particle diameter of 3.0 μm, containing a polycarbonate chain, or a polycarbonate and a polypolyester chains; a polyurethane resin of the polyurethane resin emulsion being more preferably one obtained by a reaction of a polyol containing a polycarbonate polyol or polycarbonate and polyester polyols, and an aliphatic acid type isocyanate compound which has a sulfonic group in the molecule; and, further, containing an epichlorohydrin polyamide resin and a water-soluble epoxy compound and/or acetoacetylated vinylalcohol.

It is estimated that an ink solvent absorbing layer using a polyurethane resin described above can form images by generation of pores having ink solvent absorbing ability accompanied with formation of weak coagulation between a cation and an anion.

In the invention, it is preferable to provide a layer containing a thermoplastic resin on an ink absorption layer in respect to achieving the object of the invention.

The layer containing a thermoplastic resin may be a layer comprising only a thermoplastic resin or a layer being added with such as a water-soluble binder, if necessary. The thermoplastic resin is preferably in the state of fine particles, in respect to ink permeation.

A thermoplastic resin or fine particles include, for example, polycarbonate, polyacrylonitrile, polystyrene, polyacrylic acid, polymethacrylic acid, polyvinyl chloride, polyvinylidene chloride, polyvinyl acetate, polyester, polyamide, polyether, coplymers thereof and salts thereof, and among them are preferable a styrene-acrylic acid ester copolymer, a vinyl chloride-vinyl acetate copolymer, a vinyl chloride-acrylic acid ester copolymer, an ethylene-vinyl acetate copolymer, an ethylene-acrylic acid ester copolymer and a SBR latex. A thermoplastic resin or fine particles may be used as a mixture of plural polymers having different monomer compositions, particle diameters and polymerization degrees.

At the selection of thermoplastic resin or fine particles, it is necessary to take ink affinity, gloss of images after fixing by heat and pressure, image fastness and mold-releasing property in consideration.

As for ink affinity, in case of a particle diameter of a thermoplastic fine particles of less than 0.05 μm, separation of pigment particles and an ink solvent becomes slow resulting in slow down of ink absorbing speed. While, the diameter exceeds 10 μm, it is not preferred in respect to adhesion with a solvent absorption layer adjacent to an ink receiving layer when it is coated on a support material, and film strength of an ink-jet recording medium after being coated and dried. Therefore, a particle diameter of thermoplastic fine particles is preferably from 0.05 to 10 μm, more preferably from 0.1 to 5 μm, and furthermore preferably from 0.1 to 1 μm.

Further, glass transition temperature (Tg) is included as a standard of selecting a thermoplastic resin or fine particles. When Tg is lower than a temperatures of coating and drying, for example, since temperatures at coating and drying in manufacturing of a recording medium is already higher than the Tg, pores formed by thermoplastic fine particles for permeation of an ink solvent may have been disappeared.

On the other hand, when Tg is higher than a temperatures at which a support material causes deformation, a fixing process at high temperatures is required for fusion film formation after ink-jet recording by a pigment ink, which may causes problems such as a burden to equipment and thermal stability of a support material. Preferable Tg of thermoplastic fine particles is from 50 to 150° C. A preferable minimum film forming temperature (MTF) is from 50 to 150° C.

Thermoplastic fine particles is, in respect to environmental adaptation, preferably ones dispersed in a water phase, and specifically preferable a water phase latex prepared by emulsion polymerization. In this case, latex prepared by emulsion polymerization utilizing a nonionic dispersant as an emulsifying agent is a preferable embodiment.

Thermoplastic fine particles utilized is, in respect to odor and safety, preferably ones having minimum residual monomer components. It is preferably not more than 3%, more preferably not more than 1%, and specifically preferably 0.1%, based on the solid weight of polymer.

As a water-soluble binder, polyvinyl alcohol and polyvinyl pyrrolidone can be used in a range of from 1 to 10% based on thermoplastic fine particles.

In the invention, it is most preferable as an embodiment of a recording medium that a recording medium has an ink absorption layer on a support material and the surface layer contains at least an inorganic pigment and thermoplastic fine particles. The reasons why it is specifically preferable are as follows.

(1) The ink absorbing speed is high, image determination of image quality such as beading and color bleed is minimized, and high speed printing suitability is provided.

(2) Surface strength of images is strong.

(3) Melt adhesion is hard to occur when images are stored in a stacked state.

(4) Coating productivity of an ink absorbing layer is excellent.

(5) Writability is provided.

In this case, the solid weight ratio of thermoplastic fine particles to inorganic pigments, in a surface layers, may be determined individually depending on such as thermoplastic fine particles and an inorganic pigment, being not specifically limited, however, it is suitably selected in a range of from 2/8 to 8/2, more preferably from 3/7 to 7/3, and furthermore preferably from 4/6 to 6/4.

As an ink used for image formation, a water phase ink composition, an oil phase ink composition and a solid (phase transform) ink composition can be used, and a water phase ink composition (for example, a water phase ink-jet recording solution containing not less than 10 weight % of water based on the total ink weight) can be specifically preferably used.

As a colorant, utilizing a pigment is characteristic to the invention in respect to image lasting quality. As a pigment in pigment inks, organic pigments such as an insoluble pigment and a lake pigment and carbon black are preferably used.

Insoluble pigments are not specifically limited, are preferable, for example, azo, azomethine, methine, diphenylmethane, triphenylmethane, quinacridone, anthraquinone, perylene, indigo, quinophthalone, isoindolidone, isoindoline, azine, oxazine, thiazine, dioxazine, thiazole, phthalocyanin, diketopyrrolopyrrole, etc.

Concrete pigments preferably used include the following. Pigments for magenta or red include, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178 and C.I. Pigment Red 222.

Orange or yellow pigments include, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94 and C.I. and Pigment Yellow 138.

Pigments for green or cyan include, for example, C.I. Pigment Blue 15, C.I. Pigment Blue 15:2, C.I. Pigment Blue 15:3, C.I. Pigment Blue 16, C.I. Pigment Blue 60 and C.I. Pigment Green 7.

The pigments can be used with a pigment dispersant if necessary, and pigment dispersants which can be utilized include, for example, surfactants such as a higher aliphatic acid salt, alkyl sulfate, alkylester sulfate, alkylsulfonate, sulfosuccinate, naphthalene sulfonate, alkyl phosphate, polyoxyalkylene alkylether phosphate, polyoxy alkylphenylene alkylphenyl ether, polyoxyethylene polyoxypropylene glycol, glycerine ester, sorbitane ester, polyoxyethylene aliphatic acid amide and amine oxide; block copolymers, random copolymers and salts thereof, comprising two or more monomers selected from styrene, a styrene derivative, a vinylnaphthalene derivative, acrylic acid, an acrylic acid derivative, maleic acid, a maleic acid derivative, itaconic acid, an itaconic acid derivative, fumaric acid and a fumaric acid derivative.

As a dispersion method of pigments, there are specifically no limitations, and, for example, various methods such as a ball mill, an attritor, a roll mill, an agitator, a Henshell mixer, a colloidal mill, an ultra sonic homogenizer, a pearl mill, a wet-type jet mill and a paint shaker can be utilized.

To eliminate coarse grains of pigment dispersion according to the invention, utilizing a centrifugal separation apparatus as well as utilizing filters is preferred.

An average particle diameter of a pigment in a pigment ink is selected considering such as stability in a ink, image density, glossy appearance and light fastness, in addition, it is also preferred to select the particle diameter in respect to improvement of gloss and sensation in quality. In the invention, reason for improvement of gloss and sensation in quality is not clear, it is estimated to be related to that a pigment in images is in a dispersed state in a film where thermoplastic fine particles are fused. To aim high speed processing, thermoplastic fine particles must be fused to form a film in a short time and, further, a pigment must be sufficiently dispersed in a film. In this case, the surface area of pigments influences a lot, and therefore an optimum region of an average diameter is supposed to be present. The average diameter of the pigment ink used in the invention is preferably not more than 300 nm, more preferably not more than 200 nm, and specifically preferably not more than 150 nm.

A water phase ink composition which is a preferable embodiment of a pigment ink is preferably used in combination with water-soluble organic solvents.

Water-soluble organic solvents include, for example, an alcohol series (for example, methanol, ethanol, propanol, isopropanol, butanol, isobutanol, sec-butanol, tert-butanol, pentanol, hexanol, cyclohexanol, benzyl alcohol, etc.), a polyalcohol series (for example, ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, thiodigrycol, etc.), a polyalcohol ether series (for example, ethyleneglycol monomethylether, ethyleneglycol monoethylether, ethyleneglycol, monobutylether, diethyleneglycol monomethylether, diethyleneglycol monoethylether, diethyleneglycol monobutylether, propyleneglycol monomethylether, propyleneglycol monobutylether, ethyleneglycol monomethylether acetate, triethyleneglycol monomethylether, triethyleneglycol monoethylether, triethyleneglycol monobutylether, ehtyleneglycol monophenylether, propyleneglycol monophenyether, etc.), an amine series (for example, ethanolamine, diethanol amine, triethanol amine, N-methyldiethanol amine, N-ethyldiethanol amine, morpholine, N-ethylmorpholine, ethylenediamine, diethylenediamine, triethylene tetramine, tetraethylene pentamine, polyethylene imine, pentamethyldiethylene triamine, tetramethylpropylene diamine, etc.), an amide series (for example, formamide, N,N-dimethylformamide, N,N-dimethyl acetoamide, etc.), a heterocyclic series (for example, 2-pyrrolidone, N-methyl-dimethylacetoamide, etc.), a sulfoxide series (for example, dimethylsulfoxide, etc.), a sulfone series (for example, sulfolane, etc.), urea, acetonitrile and acetone. Preferable water-soluble organic solvents include polyalcohol series. Further, specifically preferable is to utilize polyalcohol and polyalcohol ether in combination.

Water-soluble organic solvents may be used alone or in combinations of plural kinds. The addition amount of a water-soluble organic solvent in ink is from 5 to 60 weight % and preferably from 10 to 35 weight %, as the total amount.

The ink used in the invention preferably comprises an acetylene series surfactant. As the acetylene series surfactant used in the present invention, acetylene diols and acetylene diols with ethyleneoxide represented by at least one of following formulas are preferable.

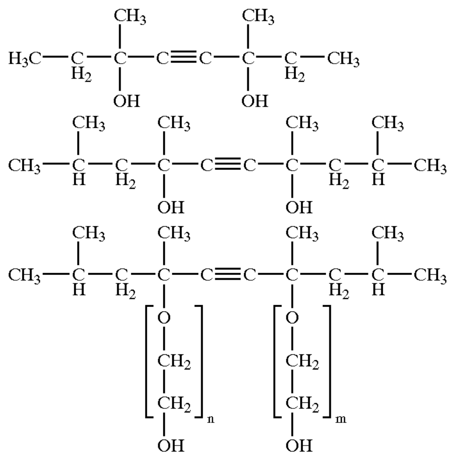

In the above formulas, each of n and m represents an integer number.

As the specific examples of the acetylene series surfactants, Surfinol 82, 104, 440, 465 and 485 are preferably used.

An ink composition may be suitably added with such as a thermoplastic fine particles, a viscosity control agent, a surface tension control agent, a specific resistance control agent, a film forming agent, a dispersant, a surfactant, a UV absorbent, a anti-oxidant, an anti-fading agent, an anti-fungal agent, a rust inhibitor; depending on the purpose of improving extrusion stability, affinity to a print head or ink cartridge, storage stability, image lasting property and other various functions.

Specifically, addition of thermoplastic fine particles is preferable in respect to achieving the effect of the invention. As thermoplastic fine particles, the kinds explained above as a thermoplastic resin or fine particles which can be added in a surface layer of a recording medium can be utilized. Specifically preferable is to utilize one which does not cause viscosity increase or precipitation when being added into an ink. A average particle diameter of thermoplastic fine particles is preferably not more than 0.5 $\mu$m, more preferably it is selected in a range from 0.2 to 2 times of a average particle diameter of pigments in an ink, in respect to stability. Thermoplastic fine particles added are preferable to melt and soften in a range from 50 to 200° C.

An ink composition preferably has a viscosity at flying of not more than 40 mPa·s, and more preferably not more than 30 mPa·s.

An ink composition preferably has a surface tension at flying of not less than 20 mN/m, and more preferably from 30 to 45 mN/m.

A solid content of a pigment in an ink can be selected in a range of form 0.1 to 10%, and to obtain photographic images so-called gradation inks which have each varied solid concentration of a pigment are preferably used, specifically preferably used are each gradation ink of yellow, magenta, cyan and black inks. Further, it is also preferred to utilize special color, such as red, green and blue inks, if necessary, in respect to color reproduction.

To form ink-jet pigment images of the invention, there are no limitations provided that a printer is one like a commercially available printer which has a storing portion for a recording medium, a transportation portion, an ink cartridge and an ink-jet print head, and it is useful in case of utilizing ink-jet photography for commercial purpose that a printer is a series of printer set comprised of at least a storing portion of a roll-type recording medium, a transportation portion, an ink-jet print head and a cutting portion, and, if necessary, a heating portion, a pressing portion and a recorded print stock portion.

A print head is any of a piezo type, a thermal type and a continuous type, and preferably a piezo type in respect to stability of pigment inks.

It is a preferred embodiment in which a C value is improved to as high as achieving the effect of the invention by some treatment after images being printed. In the treatment images are subjected to heat or pressure, or to both of heat and pressure, added with solvents or plasticizers followed by being heated, or heated after supply of thermoplastic resin components. Further the treatment may be performed in combinations or plural times.

In the invention, a recording medium is preferable to be subjected to heat fixing treatment after a pigment ink is printed.

In the method described above, specifically preferable is to heat fix pigment images in which a pigment and a thermoplastic resin are present as a mixture or in the neighborhood each other, and in this case the thermoplastic resin is specifically preferably fused partially or completely and further being formed into a film.

A method to incorporate a thermoplastic resin with pigment images includes the following:

(1) A method in which a recording medium containing a thermoplastic resin or preferably thermoplastic fine particles is utilized (2) A method in which a thermoplastic resin is supplied to a recording medium before or after printing (3) A method utilizing a pigment ink in which a thermoplastic resin coexists is utilized However, so-called laminating process, in which a thermoplastic resin is prepared as a sheet type and subjected to heat fixing process while being overlapped with images, is not necessarily preferred because of disadvantages such as a complicated apparatus, wrinkling by slippage and slow processing speed. Further, images having been lamination processed is not preferred as photographic images due to unnatural gloss appearance of the surface resin layer.

For heat fixing process, an energy as much as achieving the effect of the invention sufficiently may be supplied to images, however, an excessively high energy is not preferred because it causes deformation of a support material resulting in deteriorated glossy appearance. The heating temperature is one at which pigment images can be made smooth, preferably in a range of from 60 to 200° C., and more preferably in a range of from 80 to 160° C.

Heating may be performed by a heating device equipped in a printer or by a heating device provided separately. As a heating mean, preferred is to utilize a heating roll because it is suitable to prevent unevenness, to minimize the space and to perform continuous processing. Further, a heat fixing device for electrophotography can be diverted as these apparatuses, which is also advantageous in respect to cost.

For example, heat and pressure process may be provided by passing a recording medium between a heating roll including a exothermic body and a pressure roll, or a recording medium may be heated being sandwiched with two heating rolls. A heat roll is comprised of a hollow roll and rotated by a driving mean. In a roll is included, an exothermic body, for example, such as halogen lamp heater, ceramic heater and nicrome wire. The roll is preferably made of a material having a high thermal conductivity, and specifically preferable is a metal roll. The surface of a roll is preferably coated with a fluorine resin to prevent contamination. Other than this, a silicone rubber roll having been coated with heat-resistant silicone may be utilized.

A transportation speed of a recording medium in case of utilizing a heat roll is preferably in a range of from 1 to 15 mm/sec. This is preferred in respect to high speed processing as well as to image quality.

To obtain higher sensation in quality and gloss, images are preferably subjected to pressure simultaneous with or just after heating. The pressure to press images is preferably in a range of from $9.8\times10^4$ to $4.9\times10^6$ Pa. This is because the pressure accelerates film formation.

EXAMPLES

The present invention will be more concretely explained according to examples, however the invention is not limited thereby.

First, a water phase pigment ink is prepared according to the method described below.

Preparation of Water Phase Pigment Ink

Preparation of Pigment Dispersion Solution

Preparation of Yellow Pigment Dispersion 1

| | |
|---|---|
| C.I. Pigment Yellow 74 | 20 weight % |
| Styrene-acrylic acid copolymer (molecular weight: 10,000, acid value: 120) | 12 weight % |
| Diethylene glycol | 15 weight % |
| Ion-exchanged water | 53 weight % |

Each additive described above was mixed each other, and was dispersed by use of a horizontal type bead mill (Systemzetamini, produced by Ashizawa Co.) charged with zirconia beads of 0.3 mm at 60 volume % to prepare yellow pigment dispersion 1. The average particle diameter of the yellow pigment obtained was 112 nm.

Preparation of Magenta Pigment Dispersion 1

| | |
|---|---|
| C.I. Pigment Red 122 | 25 weight % |
| Johncryl 61 (acryl-styrene type resin, manufactured by Jhonson Co.) | 18 weight % as a solid content |
| Diethylene glycol | 15 weight % |
| Ion-exchanged water | 42 weight % |

Each additive described above was mixed each other, and was dispersed by use of a horizontal type bead mill (Systemzetamini, produced by Ashizawa Co.) charged with zirconia beads of 0.3 mm at 60 volume % to prepare magenta pigment dispersion 1. The average particle diameter of the magenta pigment obtained was 105 nm.

Preparation of Cyan Pigment Dispersion 1

| | |
|---|---|
| C.I. Pigment Blue 15:3 | 25 weight % |
| Johncryl 61 (acryl-styrene type resin, manufactured by Jhonson Co.) | 15 weight % as a solid content |
| Glycerin | 10 weight % |
| Ion-exchanged water | 50 weight % |

Each additive described above was mixed each other, and was dispersed by use of a horizontal type bead mill (Systemzetamini, produced by Ashizawa Co.) charged with zirconia beads of 0.3 mm at 60 volume % to prepare cyan pigment dispersion 1. The average particle diameter of the cyan pigment obtained was 87 nm.

Preparation of Black Pigment Dispersion 1

| | |
|---|---|
| Carbon black | 20 weight % |
| Styrene-acrylic acid copolymer (molecular weight: 7,000, acid value: 150) | 10 weight % |
| Glycerin | 10 weight % |
| Ion-exchanged water | 60 weight % |

Each additive described above was mixed each other, and was dispersed by use of a horizontal type bead mill (Systemzetamini, produced by Ashizawa Co.) charged with zirconia beads of 0.3 mm at 60 volume % to prepare black pigment dispersion 1. The average particle diameter of the black pigment obtained was 75 nm.

Preparation of Each Color Dispersion 2

In a similar manner to the preparation of each color dispersion 1 described above, except that dispersing time of each dispersion was shortened, each color dispersion 2 having pigments of the following average particle diameters was prepared.

Yellow pigment dispersion 2:

average particle diameter of 170 nm

Magenta pigment dispersion 2:

average particle diameter 190 nm

Cyan pigment dispersion 2:

average particle diameter of 180 nm

Black pigment dispersion 2:

average particle diameter of 160 nm

Preparation of Each Color Dispersion 3

In a similar manner to the preparation of each color dispersion 1 described above, except that dispersing condition of each dispersion was varied and further removing a large particle component was removed by means of centrifugal separation, each color dispersion 3 having pigments of the following average particle diameters was prepared.

Yellow pigment dispersion 3:

average particle diameter of 41 nm

Magenta pigment dispersion 3:

average particle diameter of 42 nm

Cyan pigment dispersion 3:

average particle diameter of 40 nm

Black pigment dispersion 3:

average particle diameter of 35 nm

Preparation of Each Color Dispersion 4

In a similar manner to the preparation of each color dispersion 2 described above, except that dispersing time of each dispersion was further shortened, each color dispersion 4 having pigments of the following average particle diameters was prepared.

Yellow pigment dispersion 4:
average particle diameter of 230 nm

Magenta pigment dispersion 4:
average particle diameter 220 nm

Cyan pigment dispersion 4:
average particle diameter of 215 nm

Black pigment dispersion 4:
average particle diameter of 230 nm

Preparation of Pigment Ink

Preparation of Ink Set 1

Preparation of Yellow Concentrated Ink 1

| | |
|---|---|
| Yellow pigment dispersion 1 | 15 weight % |
| Ethylene glycol | 20 weight % |
| Diethylene glycol | 10 weight % |
| Surfactant (Surfinol 465, manufactured by Nisshin Kagaku Industrial Co.) | 0.1 weight % |
| Ion-exchanged water | 54.9 weight % |

Each component above was mixed and stirred, being filtered through a filter of 1 μm to prepare the yellow concentrated ink 1 as a water-based pigment ink of the invention. A average particle diameter of the pigment in said ink was 120 nm, and a surface tension γ was 36 mN/m.

Preparation of Yellow Dilute Ink 1

| | |
|---|---|
| Yellow pigment dispersion 1 | 3 weight % |
| Ethylene glycol | 25 weight % |
| Diethylene glycol | 10 weight % |
| Surfactant (Surfinol 465, manufactured by Nisshin Kagaku Industrial Co.) | 0.1 weight % |
| Ion-exchanged water | 61.9 weight % |

Each component above was mixed and stirred, being filtered through a filter of 1 μm to prepare the yellow dilute ink 1 as a water based pigment ink of the invention. A average particle diameter of the pigment in said ink was 118 nm, and a surface tension γ was 37 mN/m.

Preparation of Magenta Concentrated Ink 1

| | |
|---|---|
| Magenta pigment dispersion 1 | 15 weight % |
| Ethylene glycol | 20 weight % |
| Diethylene glycol | 10 weight % |
| Surfactant (Surfinol 465, manufactured by Nisshin Kagaku Industrial Co.) | 0.1 weight % |
| Ion-exchanged water | 54.9 weight % |

Each component above was mixed and stirred, being filtered through a filter of 1 μm to prepare the magenta concentrated ink 1 as a water-based pigment ink of the invention. A average particle diameter of the pigment in said ink was 113 nm, and a surface tension γ was 35 mN/m.

Preparation of Magenta Dilute Ink 1

| | |
|---|---|
| Magenta pigment dispersion 1 | 3 weight % |
| Ethylene glycol | 25 weight % |
| Diethylene glycol | 10 weight % |
| Surfactant (Surfinol 465, manufactured by Nisshin Kagaku Industrial Co.) | 0.1 weight % |
| Ion-exchanged water | 61.9 weight % |

Each component above was mixed and stirred, being filtered through a filter of 1 μm to prepare the magenta dilute ink 1 as a water-based pigment ink of the invention. An average particle diameter of the pigment in said ink was 110 nm, and a surface tension was γ 37 mN/m.

Preparation of Cyan Concentrated Ink 1

| | |
|---|---|
| Cyan pigment dispersion 1 | 10 weight % |
| Ethylene glycol | 20 weight % |
| Diethylene glycol | 10 weight % |
| Surfactant (Surfinol 465, manufactured by Nisshin Kagaku Industrial Co.) | 0.1 weight % |
| Ion-exchanged water | 59.9 weight % |

Each component above was mixed and stirred, being filtered through a filter of 1 μm to prepare the cyan concentrated ink 1 as a water-based pigment ink of the invention. An average particle diameter of the pigment in said ink was 95 nm, and a surface tension γ was 36 mN/m.

Preparation of Cyan Dilute Ink 1

| | |
|---|---|
| Cyan pigment dispersion 1 | 2 weight % |
| Ethylene glycol | 25 weight % |
| Diethylene glycol | 10 weight % |
| Surfactant (Surfinol 465, manufactured by Nisshin Kagaku Industrial Co.) | 0.2 weight % |
| Ion-exchanged water | 62.8 weight % |

Each component above was mixed and stirred, being filtered through a filter of 1 μm to prepare the cyan dilute ink 1 as a water-based pigment ink of the invention. An average particle diameter of the pigment in said ink was 92 nm, and a surface tension γ was 33 mN/m.

Preparation of Black Concentrated Ink 1

| | |
|---|---|
| Black pigment dispersion 1 | 10 weight % |
| Ethylene glycol | 20 weight % |
| Diethylene glycol | 10 weight % |
| Surfactant (Surfinol 465, manufactured by Nisshin Kagaku Industrial Co.) | 0.1 weight % |
| Ion-exchanged water | 59.9 weight % |

Each component above was mixed and stirred, being filtered through a filter of 1 μm to prepare the black concentrated ink 1 as a water-based pigment ink of the invention. An average particle diameter of the pigment in said ink was 85 nm, and a surface tension γ was 35 mN/m.

Preparation of Black Dilute Ink 1

| | |
|---|---|
| Black pigment dispersion 1 | 2 weight % |
| Ethylene glycol | 25 weight % |
| Diethylene glycol | 10 weight % |
| Surfactant (Surfinol 465, manufactured by Nisshin Kagaku Industrial Co.) | 0.1 weight % |
| Ion-exchanged water | 62.9 weight % |

Each component above was mixed and stirred, being filtered through a filter of 1 μm to prepare the black dilute ink 1 as a water-based pigment ink of the invention. An average particle diameter of the pigment in said ink was 89 nm, and a surface tension γ was 36 mN/m.

The above eight kinds of inks were named as Ink Set 1.

Preparation of Ink Set 2

In a similar manner to the preparation of above eight kinds of inks as Ink Set 1, except that each thereto was added 3% of a thermoplastic resin Yodozol GD86B (styrene-acryl type emulsion, average particle diameter: 90 nm, Tg: 60° C., manufactured by Nippon NSC Co.), a yellow dilute ink 2, a yellow concentrated ink 2, a magenta dilute ink 2, a magenta concentrated ink 2, a cyan dilute ink 2, a cyan concentrated ink 2, a black dilute ink 2 and a black concentrated ink 2 were prepared, and these were named as Ink Set 2.

Preparation of Ink Set 3

In the preparation of above eight kinds of inks as Ink Set 1, each thereto was added 8% of a thermoplastic Microgel E-1002 (Tg; approximately 60° C., average particle diameter: 100 nm, manufactured by Nippon Paint Co., Ltd.), a yellow dilute ink 3, a yellow concentrated ink 3, a magenta dilute ink 3, a magenta concentrated ink 3, a cyan dilute ink 3, a cyan concentrated ink 3, a black dilute ink 3 and a black concentrated ink 3 were prepared, and these were named as Ink Set 3.

Preparation of Ink Set 4

Inks were prepared in similar manners to those of in the preparation of above eight kinds of inks as Ink Set 1, except that each of color dispersions 3 was added to the each color ink instead of each of color dispersions 1. Thus, a yellow dilute ink 4 having an average diameter of 46 nm, a yellow concentrated ink 4 having an average diameter of 46 nm, a magenta dilute ink 4 having an average diameter of 47 nm, a magenta concentrated ink 4 having an average diameter of 47 nm, a cyan dilute ink 4 having an average diameter of 45 nm, a cyan concentrated ink 4 having an average diameter of 45 nm, a black dilute ink 4 having an average diameter of 40 nm and a black concentrated ink 4 having an average diameter of 40 nm were prepared, and these were named as Ink Set 4.

Preparation of Ink Set 5

Inks were prepared in similar manners to those of in the preparation of above eight kinds of inks as Ink Set 1, except that each of color dispersions 2 was added to the each color ink instead of each of color dispersions 1. Thus, a yellow dilute ink 5 having an average diameter of 178 nm, a yellow concentrated ink 5 having an average diameter of 178 nm, a magenta dilute ink 5 having an average diameter of 198 nm, a magenta concentrated ink 5 having an average diameter of 198 nm, a cyan dilute ink 5 having an average diameter of 188 nm, a cyan concentrated ink 5 having an average diameter of 188 nm, a black dilute ink 5 having an average diameter of 168 nm and a black concentrated ink 5 having an average diameter of 168 nm were prepared, and these were named as Ink Set 5.

Preparation of Ink Set 6

Inks were prepared in similar manners to those of in the preparation of above eight kinds of inks as Ink Set 1, except that each of color dispersions 4 was added to the each color ink instead of each of color dispersions 1. Thus, a yellow dilute ink 6 having an average diameter of 236 nm, a yellow concentrated ink 6 having an average diameter of 236 nm, a magenta dilute ink 6 having an average diameter of 226 nm, a magenta concentrated ink 6 having an average diameter of 226 nm, a cyan dilute ink 6 having an average diameter of 221 nm, a cyan concentrated ink 6 having an average diameter of 221 nm, a black dilute ink 5 having an average diameter of 236 nm and a black concentrated ink 6 having an average diameter of 236 nm were prepared, and these were named as Ink Set 6.

Preparation of Ink-Jet Pigment Image

An ink-jet image was formed by the following method and C value, Ra and 60-degree specular glossiness were adjusted. C value, Ra and 60-degree specular glossiness of each ink-jet pigment image were measured by the following method.

Measurement of C value

C value at a black solid portion of each image prepared according to the method described below was measured by the use of an IMAGE CLARITY METER (ICM-IDP) manufactured by Suga Test Instruments Co.

Measurement of Ra

A center line roughness at a black solid portion, Ra, of each image prepared according to the method described below was measured by the use of an RSTPLUS non-contact three dimensional micro surface form measuring system, produced by WYKO Co.

Measurement of 60-Degree Specular Glossiness

For each image prepared according to the method described below, 60-degree mirror glossiness of each imaged surface was measured according to JIS-Z-8741. A GLOSS METER (VGS-1001DP) produced by Nippon Denshoku Industries Co., Ltd. was used for the measurement.

The obtained C value, Ra and 60-degree specular glossiness of each image are shown in Table 1 described below.

Preparation of Comparison Image 1, Image 1 and Image 2

Preparation of Recording Medium 1

A recording medium 1 was prepared by coating and drying VINYBLAN 602 (manufactured by Nisshin Kagaku Kogyo Co. Ltd.) on Ink-jet Paper Photolike QP (manufactured by Konica Corp.) so as to make a solid amount 5 $g/m^2$ by use of a wired rod.

Eight color inks of Ink Set 1 were loaded in an ink-jet printer equipped with a heat fixing device, Recording Medium 1 described above being supplied, and a wedge image of yellow, magenta, cyan and black, a grid test chart in which bands of Y, M, C, B, G, R and Bk each were drawn vertically and horizontally at a width of 1 cm and a personal portrait were printed. Thereafter, heat fixing was performed by the fixing device equipped in the apparatus at 70, 90 and 110° C. of a surface temperature of the fixing device to prepare Comparative Image 1, Image 1 and Image 1.

Preparation of Image 3

Image 3 was prepared in a similar manner to the preparation of Image 1 described above, except that a fixing operation was eliminated. However, Image 3 was sprayed with ethyl acetate and subjected to pressure treatment after the image formation.

Preparation of Image 4

An image was prepared in a similar manner to the preparation of Image 1 described above, except that Ink-jet Paper Photolike QP was used as a recording medium and a fixing operation was eliminated. Continuously, Image 4 was prepared by coating and drying VINYBLAN 602 (manufactured by Nisshin Kagaku Kogyo Co. Ltd.) thereon so as to make a solid amount 2 $g/m^2$ by use of a wired rod followed by fixing treatment by use of a heat fixing device. Herein, a surface temperature of the fixing device was 110° C.

Preparation of Images 5 to 7

Using Ink-jet Paper Photolike QP manufactured by Konica Corp., eight inks of Ink Set 2 being loaded in an ink-jet printer equipped with a heat fixing device, recording was performed followed by heat fixing by a fixing device equipped in the apparatus. A surface temperature of the fixing device was 110° C. The obtained image was named as Image 5.

Next, Image 6 was prepared in a similar manner to the preparation of Image 5, except that a surface temperature of the fixing device was changed to 130° C.

Next, Image 7 was prepared in a similar manner to the preparation of Image 5, except that Ink Set 3 was used in stead of Ink Set 2.

Preparation of Comparative Image 2 and Images 8 to 11

Preparation of Recording Medium 2

Preparation of Silica Dispersion Solution

Gas phase manufactured silica having approximately 0.012 μm of a average particle diameter of primary particles (manufactured by Tokuyama Co., Ltd.: QS-20) of 125 kg was suction dispersed in 620 l of pure water at room temperature by use of Jet Stream Inductor Mixer TDS, a product of Mitamura Riken Kogyo Co., Ltd., and the total volume was made to 694 l by pure water.

Next, 69.4 l of the silica dispersion solution described above was added with stirring into 18 l of an aqueous solution (pH=2.3) containing 1.14 kg of Cation Polymer P-1 (187B), 2 l of ethanol and 1.5 l of propanol, and then were added 7.0 l of an aqueous solution containing 260 g of boric acid and 230 g of borax; and 1 g of a deforming agent SN381 (manufactured by Sannopuko Co., Ltd.). The mixed solution was dispersed by High Pressure Homogenizer produced by Sanwa Kogyo Co., Ltd., and the total volume was made to 97 l by pure water to prepare the silica dispersion solution.

P-1

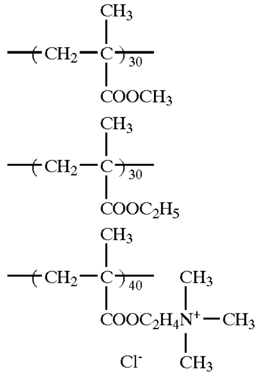

Mn = 13,000

Preparation of Coating Solution 1

Each additive below was mixed successively into 600 ml of the silica dispersion solution described above while stirring at 40° C. to prepare Coating Solution 1.

Polyvinyl alcohol (manufactured by Kuraray Co., Ltd.: PVA 203) of 10% aqueous solution 6 ml Polyvinyl alcohol (manufactured by Kuraray Co., Ltd.: PVA 235) of 7% aqueous solution 185 ml Pure water to make the total volume to 1000 ml Preparation of Coating Solution 2

Into Coating Solution 1, being stirred at 40° C., was added a thermoplastic resin (styrene-acryl type latex, Tg: 73° C., average particle diameter: 0.2 μm, solid content: 40%) so as to make the solid ratio of silica/thermoplastic fine particles 6/4, and further was added thereto suitably pure water so as to make the viscosity 45 mPa·s at 40° C. to prepare Coating Solution 2.

Preparation of Recording Medium 2

On a paper support of which the both surfaces were covered with polyethylene (having a thickness of 220 μm, containing 13 weight % based on polyethylene of anatase type titanium oxide in polyethylene of an ink absorbing layer surface), were coated Coating Solution 1 described above as the first, second and third layers in the order from the support side and Coating Solution 2 described above as the fourth layer, through a slide hopper and dried to prepare Recording Medium 2. Herein, the coating solution was coated while being heated at 40° C., after being cooled for 20 sec. just after coating in a cooling zone which was kept at 0° C., the sample was dried successively with 25° C. air flow (relative humidity of 15%) for 60 sec, with 45° C. air flow (relative humidity of 25%) for 60 sec. and with 50° C. air flow (relative humidity of 25%) for 60 sec. The sample was further rehumidified for 2 min. under the condition of from 20 to 25° C. and a relative humidity of from 40 to 60%, and was wound up. The layer thickness of the first to fourth layers were 60 μm respectively. This recording medium was formed into a roll form having a roll width of 127 mm and a roll length of 100 m.

Preparation of Recording Medium 3

Preparation of Coating Solution 3

Coating Solution 3 was prepared in a similar manner to the preparation of Coating Solution 2 described above, except that the solid ratio of silica/thermoplastic fine particles was changed to 5/5.

Preparation of Recording Medium 3

Recording Medium 3 was prepared in a similar manner to the preparation of Recording Medium 2 described above, except that the coating solution for the fourth layer was changed to Coating Solution 3.

Preparation of Recording Medium 4

Preparation of Coating Solution 4

Coating Solution 4 was prepared in a similar manner to the preparation of Coating Solution 2 described above, except that the thermoplastic fine particles were changed to styrene-acryl type latex (Tg: 73° C., average particle diameter: 0.8 μm, solid content: 40%) and the solid ratio of silica/thermoplastic fine particles was changed to 3/7.

Preparation of Recording Medium 3

Recording Medium 4 was prepared in a similar manner to the preparation of Recording Medium 2 described above, except that the coating solution for the fourth layer was changed to Coating Solution 4.

Preparation of Comparative Image 2, Image 8 and Image 9

Image recording in a similar manner to Image 1 was performed, by loading eight color inks of Ink Set 1 in an ink-jet printer equipped with a heat fixing device, and by utilizing Recording Medium 2 prepared above. Thereafter, heat fixing was performed by the fixing device equipped in the apparatus at 70, 90 and 100° C. of a surface temperature of the fixing device to prepare Comparative Image 2, Image 8 and Image 9.

Preparation of Image 10 and Image 11

Image recording in a similar manner to Image 1 was performed, by loading eight color inks of Ink Set 1 in an ink-jet printer equipped with a heat fixing device, and by utilizing Recording Media 3 and 4 prepared above. Thereafter, heat fixing was performed by the fixing device equipped in the apparatus to prepare Image 10 and Image 11. Herein, a surface temperature of the fixing device was 100° C.

Preparation of Image 12

A thermoplastic resin (styrene-acryl type latex, Tg: 73° C., average particle diameter: 0.2 μm, solid content: 40%) was coated on MC photographic paper manufactured by Seiko Epson Co., Ltd. by use of a wired rod so as to make a solid amount 5 g/$m^2$ and dried to prepare Recording Medium 5.

Next, eight color inks of Ink Set 1 were loaded in an ink-jet printer equipped with a heat fixing device shown in FIG. 1, and a wedge image of yellow, magenta, cyan and black, a grid test chart in which bands of Y, M, C, B, G, R and Bk were drawn vertically and horizontally at a width of 1 cm and a personal portrait were printed on Recording Medium 5. Thereafter, heat fixing was performed by the fixing device equipped in the apparatus. The surface temperature of the fixing device was set to 110° C. to prepare an image, which is named as Image 12.

Preparation of Image 13

Eight color inks of Ink Set 1 were loaded in an ink-jet printer equipped with a heat fixing device, and image recording similar to Image 1 was performed using Recording Medium 2 prepared above. Thereafter, heat fixing was performed by the fixing belt equipped in the apparatus at a surface temperature of the fixing belt of 110° C. to prepare Image 13.

Preparation of Image 14

Using Ink-jet Paper Photolike QP manufactured by Konica Corp., eight inks of Ink Set 4 being loaded in an ink-jet printer, and image recording similar to Image 1 was performed except that heat fixing by a fixing device equipped in the apparatus was not subjected. The obtained image was named as Image 14.

Preparation of Image 15

Eight color inks of Ink Set 5 were loaded in an ink-jet printer equipped with a heat fixing device shown in FIG. 1, and image recording similar to Image 1 was performed using Recording Medium 1 prepared above. Thereafter, heat fixing was performed by the fixing device equipped in the apparatus at a surface temperature of the fixing belt of 110° C. to prepare Image 15.

Preparation of Image 16

Image 16 was prepared in the similar manner of the Image 15, except that eight color inks of Ink Set 6 were used instead of the inks of Ink Set 5.

C value, Ra and 60-degree specular glossiness of each ink-jet pigment image are shown in Table 1 below.

Evaluation of Formed Images

Images 1 to 16 and Comparative Images 1 and 2, prepared above, were evaluated according to each of the following evaluation described below.

Gloss Evaluation by Visual Observation

To judge whether a gloss similar to that of silver salt photography was obtained or not, samples for evaluation were comparatively evaluated with a silver salt photograph (glossy type) having the same images. Evaluation was performed by means of visual observation by 20 persons of general evaluators and judgment was made based on the following criteria.

Evaluation 3: Not less than 15 persons evaluated the sample to be more glossy than photography Evaluation 2: From 5 to less than 15 persons evaluated the sample to be more glossy than photography Evaluation 1: Less than 5 persons evaluated the sample to be more glossy than photography Evaluation of Bronzing Bronzing, which is a phenomenon characteristic to pigments and causes deterioration of image quality, was evaluated according to the following method. Evaluation of bronzing was performed by observing images under fluorescent lamps at various observation angles (at 80°, 60°, 45° and 30, when let right above as 90° and right side as 0°). Samples which show metallic gloss at any angle were judged to have bronzing, and samples which scarcely show metallic gloss at any angle were judged not to have bronzing.

Evaluation of Water Resistance

Appearance of film peeling was observed after each image prepared was immersed in water of 20° C. for 1 hour,

TABLE 1

| Image No. | Ink set No. | Recording medium No. | Heat fixing temperature (° C.) | C value | Ra (μm) | 60 degree gloss | Remarks |
|---|---|---|---|---|---|---|---|
| Comparative Image 1 | 1 | 1 | 70 | 52 | 0.140 | 90 | Comparison |
| Image 1 | 1 | 1 | 90 | 61 | 0.135 | Not less than 100 | Invention |
| Image 2 | 1 | 1 | 110 | 72 | 0.120 | Not less than 100 | Invention |
| Image 3 | 1 | 1 | — | 61 | 0.170 | 90 | Invention |
| Image 4 | 1 | Photolike QP | 110 | 62 | 0.160 | 90 | Invention |
| Image 5 | 2 | Photolike QP | 110 | 60 | 0.135 | 90 | Invention |
| Image 6 | 2 | Photolike QP | 130 | 61 | 0.132 | 91 | Invention |
| Image 7 | 3 | Photolike QP | 110 | 61 | 0.200 | 40 | Invention |
| Comparative Image 2 | 1 | 2 | 70 | 50 | 0.105 | 93 | Comparison |
| Image 8 | 1 | 2 | 90 | 61 | 0.090 | Not less than 100 | Invention |
| Image 9 | 1 | 2 | 110 | 74 | 0.091 | Not less than 100 | Invention |
| Image 10 | 1 | 3 | 110 | 76 | 0.092 | Not less than 100 | Invention |
| Image 11 | 1 | 4 | 110 | 75 | 0.090 | Not less than 100 | Invention |
| Image 12 | 1 | 5 | 110 | 61 | 0.550 | 50 | Invention |
| Image 13 | 1 | 2 | 105 | 75 | 0.092 | Not less than 100 | Invention |
| Image 14 | 4 | Photolike QP | — | 61 | 0.48 | 72 | Invention |
| Image 15 | 5 | 1 | 110 | 66 | 0.26 | 95 | Invention |
| Image 16 | 6 | 1 | 110 | 60 | 0.40 | 88 | Invention |

stand for two days, and dried. This operation was repeated successively and judgment was done based on the following criteria.

Evaluation 3: No film peeling in images appears during up to 5 times repeated immersion Evaluation 2: Film peeling in images appears during from 2 to 5 times repeated immersion Evaluation 1: Film peeling in images appears during the first immersion Evaluation of Oxidizing Gas Resistance Evaluation of oxidizing gas resistance was performed by measuring the variation of optical density with each image, which had been pasted up on a wall of an office (room temperature: 25° C.) so as not to be lighted by outdoor sunlight directly, and stored for 4 months under the condition of forced and continuous inflow of and exposure to open air.

Herein, since density loss of cyan image is largest at a measurement, the evaluation was performed for density loss in cyan image (in the vicinity of a reflection density of 1) and judgment was made according to the following criteria.

Evaluation 3: A ratio of density loss after 4 month storage is less than 5%

Evaluation 2: A ratio of density loss after 4 month storage is not less than 5% and less than 10%

Evaluation 1: A ratio of density loss after 4 month storage is not less than 10%

The results of each measurement and evaluation obtained above are shown in Table 2.

TABLE 2

| Image No. | C value | Ra (μm) | 60 degree gloss | Gloss by visual observation | Evaluation of bronzing | Evaluation of water resistance | Evaluation of oxidizing gas resistance | Remarks |
|---|---|---|---|---|---|---|---|---|
| Comparative Image 1 | 52 | 0.140 | 90 | 1 | Present | 1 | 1 | Comparison |
| Image 1 | 61 | 0.135 | Not less than 100 | 2 | Non | 2 | 2 | Invention |
| Image 2 | 72 | 0.120 | Not less than 100 | 3 | Non | 3 | 3 | Invention |
| Image 3 | 61 | 0.170 | 90 | 2 | Non | 2 | 2 | Invention |
| Image 4 | 62 | 0.160 | 90 | 2 | Non | 2 | 2 | Invention |
| Image 5 | 60 | 0.135 | 90 | 2 | Non | 2 | 2 | Invention |
| Image 6 | 61 | 0.132 | 91 | 2 | Non | 2 | 2 | Invention |
| Image 7 | 61 | 0.200 | 40 | 1 | Non | 2 | 2 | Invention |
| Comparative Image 2 | 50 | 0.105 | 93 | 1 | Present | 1 | 1 | Comparison |
| Image 8 | 61 | 0.090 | Not less than 100 | 2 | Non | 2 | 2 | Invention |
| Image 9 | 74 | 0.091 | Not less than 100 | 3 | Non | 3 | 3 | Invention |
| Image 10 | 76 | 0.092 | Not less than 100 | 3 | Non | 3 | 3 | Invention |
| Image 11 | 75 | 0.090 | Not less than 100 | 3 | Non | 3 | 3 | Invention |
| Image 12 | 61 | 0.550 | 50 | 1 | Present | 2 | 2 | Invention |
| Image 13 | 75 | 0.092 | Not less than 100 | 3 | Non | 3 | 3 | Invention |
| Image 14 | 61 | 0.48 | 72 | 2 | Non | 2 | 2 | Invention |
| Image 15 | 66 | 0.26 | 95 | 2 | Non | 2 | 2 | Invention |
| Image 16 | 60 | 0.40 | 88 | 2 | non | 2 | 3 | Invention |

The following items have been confirmed by the results described in Table 2.

That is to say, images having a C value of not less than 60, compared to images having a C value of less than 60, are proved to be superior in gloss by visual observation, image quality by reduced bronzing, water resistance and oxidizing gas resistance. Further, when a C value exceed 70, the characteristics described above have been proved to be further improved to achieve gloss appearance and image quality almost similar to those of silver salt photography as well as greatly improved water resistance and oxidizing gas resistance. Further, it has been proved that to utilize a recording medium including thermoplastic fine particles, to perform heat fixing after printing and to combine the both thereof are extremely effective.

Further, as a result of an additional experiment, color bleeding appeared in Images 1, 2, 3 and 12, at the overlapping portion in a grid test chart in which bands of Y, M, C, B, G, R and Bk were drawn vertically and horizontally at a width of 1 cm. This is considered to be due to insufficient ink absorbing speed of a recording medium. While there found no color bleeding in Images 8 to 11 and 13, and it has been proved they also have more superior characteristic with respect to ink absorbing speed. This characteristic is desirable in obtaining high quality images.

Further, continuous 500 sheets of print at L print-size was performed for each above image. Ethyl acetate vapor filled room, and there were some problems of environmental suitability. There also observed dirt in the back surface of several sheets (provably due to adhesion of ethyl acetate to the back surface).

Further, in the formation of Images 5 to 7, partial clogging of a head appeared and streak unevenness was observed. This is presumed to be due to an addition of a resin to an ink.

On the other hand, in the formation of Images 1, 2, and 8 to 13, any problem described above did not appear and ink-jet pigment images similar to silver salt photography could be obtained at high speed.

In Images 8 to 11 and 13, there were found other superior characteristics described below.

(1) The strength of image surface is strong and being hardly flawed at handling of images.

(2) No adhesion between prints each other or of prints with an album sheet occurs when many sheets of prints are stored for a long time while stacked, or when prints are stored in and album for a long time.

(3) Images after fixing were superior in writability with such as a ball pen, a felt pen, a magic pen and a fountain pen.

EFFECTS OF THE INVENTION

The invention has been able to provide, an ink-jet pigment image of high image quality, having a high gloss comparable to that of silver salt photography as well as being superior in depression of bronzing, water resistance and oxidizing gas resistance; an ink-jet image similar to silver salt photography at high speed; and the preparation method thereof.

What is claimed is:

1. An ink-jet image forming method comprising the steps of: forming a pigment image on a recording medium by jetting a pigment ink; and adjusting the C value of the pigment image to 60 or more.

2. The ink-jet image forming method of claim 1, wherein the adjusting step comprises fixing the pigment image formed on the recording medium by heating.

3. The ink-jet image forming method of claim 1, wherein the adjusting step comprises applying pressure onto the pigment image formed on the recording medium.

4. The ink-jet image forming method of claim 2, wherein the adjusting step further comprises applying pressure onto the pigment image formed on the recording medium.

5. The inkjet image forming method of claim 1, wherein the recording medium comprises an outermost layer comprising a thermoplastic resin.

6. The ink-jet image forming method of claim 5, wherein the adjusting step comprises fixing the pigment image formed on the recording medium by heating.

7. The ink-jet image forming method of claim 6, wherein the adjusting step further comprises applying pressure onto the pigment image formed on the ink-jet recording medium.

8. The ink-jet image forming method of claim 5, wherein the recording medium further comprises inorganic pigments.

9. The ink-jet image forming method of claim 5, wherein the recording medium comprises a support and at least an ink-absorbing layer between the support and the outermost layer.

10. The ink-jet image forming method of claim 9, wherein the outermost layer further comprises inorganic pigments.

11. The ink-jet image forming method of claim 10, wherein the adjusting step comprises fixing the pigment image formed on the recording medium by heat.

12. The ink-jet image forming method of claim 11, wherein the adjusting step further comprises applying pressure onto the pigment image formed on the recording medium.

13. The ink-jet image forming method of claim 1, wherein the pigment ink comprises pigments having an average diameter of 30 nm to 200 nm.

14. The ink-jet image forming method of claim 1, wherein the jetting step comprises jetting at least a pair of pigment inks having the same color and different concentrations of pigment.

15. The ink-jet image forming method of claim 1, wherein the recording medium has at least a porous layer.

16. The ink-jet image forming method of claim 1, wherein the pigment ink comprises an acetylene series surfactant.

17. The inkjet image forming method of claim 1, wherein the method comprises a step of adjusting the 60-degree specular glossiness of the pigment image to 70% or more.

18. The ink-jet image forming method of claim 1, wherein the method comprises a step of adjusting the average centerline roughness of the pigment image to 0.5 $\mu$m or less.

19. An ink-jet image formed by jetting a pigment ink onto a recording medium, wherein the image has a C value adjusted to be not less than 60.

20. The ink-jet image of claim 19, wherein the ink-jet image has an average centerline roughness of not more than 0.5 $\mu$m.

21. The ink-jet image of claim 19, wherein the recording medium comprises at least a porous layer.

22. The inkjet image of claim 19, wherein the ink-jet image has a 60-degree specular glossiness of not less than 70%.

23. The ink-jet of claim 19, wherein the pigment ink has an average diameter of 30 nm to 200 nm.

* * * * *